Patented Feb. 21, 1950

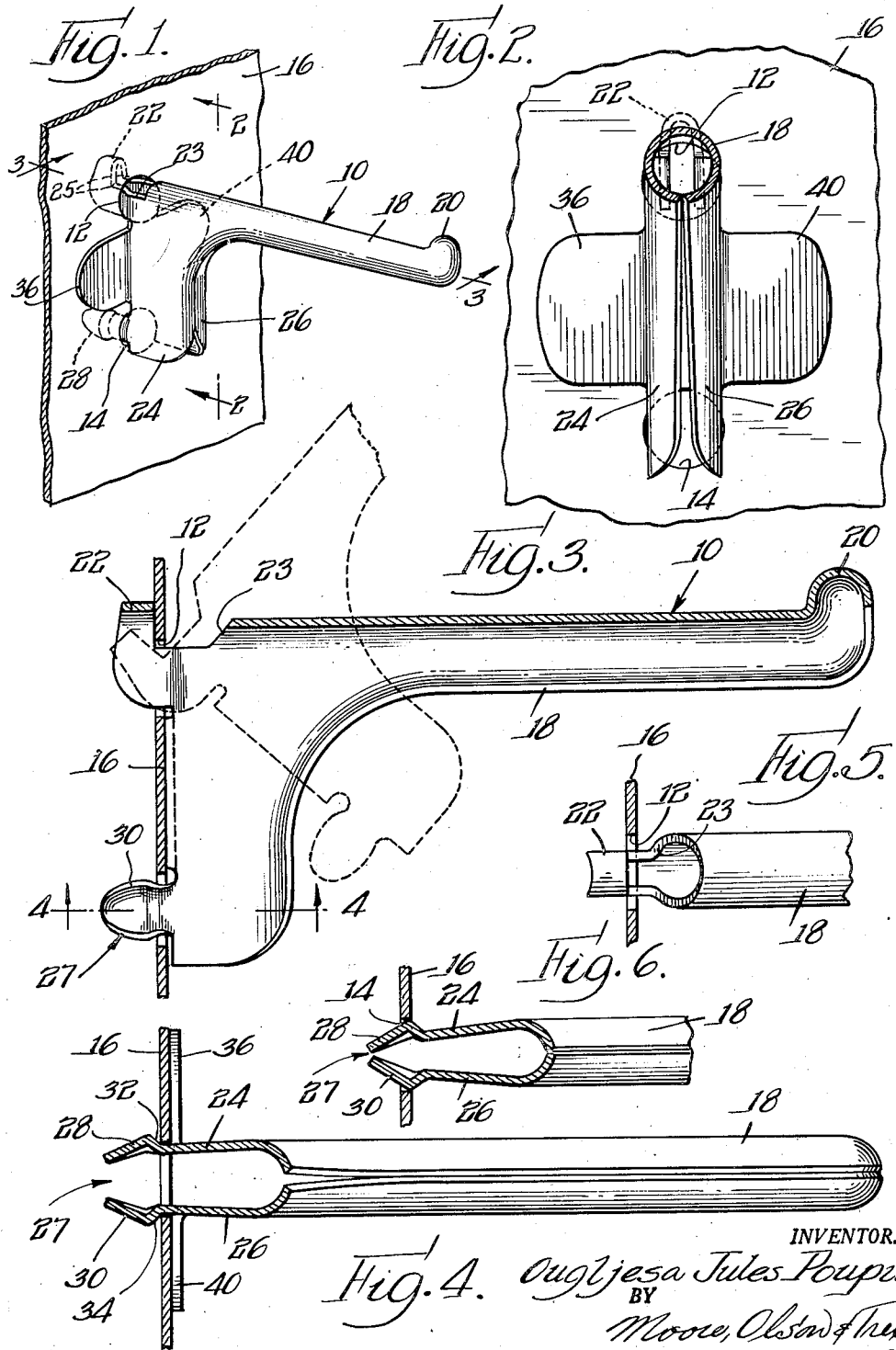

2,498,623

UNITED STATES PATENT OFFICE 2,498,623

DETACHABLE BRACKET

Ougljesa Jules Poupitch, Chicago, Ill., assignor to Illinois Tool Works, Chicago, Ill., a corporation of Illinois Application October 12, 1946, Serial No. 702,941

3 Claims. (Cl. 248—243)

This invention relates to supporting devices and has for its object the provision of an improved bracket adapted for quick snap-on engagement with an upright wall or other fixed body.

A further object of the invention is to provide a novel bracket or like device of sheet metal formed with a hooked lug and a snap fastening member for mounting the bracket securely on an apertured supporting plate.

A still further object is to provide an improved snap bracket which is inexpensive to manufacture and easy to install and which braces itself against an upright supporting body at a plurality of points to afford a rigid carrier for objects supported thereby.

Still another object is to provide an improved sheet metal bracket which can be mounted on an upright wall by first tilting the bracket upwardly and inserting a portion of the bracket in an aperture in the wall, then swinging the bracket downwardly to lock another portion of the bracket to the wall.

Other objects, advantages and features of the invention will become apparent from the following specification when taken in connection with the accompanying drawing wherein a certain preferred embodiment is set forth for purposes of illustration.

In the drawing, wherein like reference numerals refer to like parts throughout:

Fig. 1 is a perspective view of a clothes hook mounted on a supporting plate or wall, the hook being constructed in accordance with and embodying the features of this invention;

Fig. 2 is a cross-sectional view taken on the line 2—2 in Fig. 1;

Fig. 3 is a longitudinal section taken on the line 3—3 in Fig. 1;

Fig. 4 is a section taken on the line 4—4 in Fig. 3;

Fig. 5 is a plan section taken through the supporting plate and showing a portion of the hook, looking from above; and Fig. 6 is a sectional view similar to Fig. 4 but showing the locking stud of the hook in a different position.

The hook or bracket illustrated in the drawing consists essentially of a metal stamping folded upon itself to act as a clothes carrier. It is adapted to be mounted on a vertical supporting plate such as the wall of a locker. Suitable resilient material such as spring sheet steel may be used in making the hook. As shown in Fig. 1, the hook 10 has projections which are fitted into apertures as 12 and 14 in the plate 16. It will be understood, of course, that a single slot or other opening could be provided in place of the two apertures 12 and 14, if desired.

The forward section or arm 18 of the hook 10 is of elongated form and extends at right angles to the plate 16, terminating at its outer extremity in a rounded nose 20. The rear section of the bracket 10 has a hooked lug or catch 22 which is inserted in the aperture 12 in the plate 16, as indicated in Figs. 3 and 5. The catch 22 may be formed by providing a recess 23 and also by stamping and forming the piece so that said catch extends slightly above the upper surface of the arm 18, as clearly illustrated in Fig. 3. The catch 22, when formed in this maner, provides integrally joined and opposed catch arms 25. These arms are preferably formed to engage opposite walls of the aperture 12 to prevent lateral movement of the bracket relative to the plate 16. The portion of the hook which is adjacent the plate 16 is split to afford legs 24 and 26 that extend downwardly from the catch 22. Each of the legs 24 and 26 carries one half of a bifurcated stud 27, the two halves of the stud being identified as 28 and 30, respectively, Figs. 3 and 4.

To mount the hook or bracket 10 on the plate 16, the catch 22 is first inserted in the upper aperture 12 with the bracket tilted from the horizontal as indicated in broken lines in Fig. 3. Then the bracket is swung downwardly so as to initially insert the stud 27 within the lower aperture 14 in the plate 16, as shown in Fig. 6. The stud 27 is then pushed through this aperture, causing the two halves 28 and 30 thereof to be flexed inwardly toward each other. As the large portion of the stud halves 28 and 30 clear the aperture 14, they spring outwardly into interlocking relation with material adjacent said aperture. Shoulders 32 and 34, respectively, on the stud portions 28 and 30, establish the aforesaid locking relationship and cause the lower end of the hook 10 to be urged firmly against the plate 16. Tabs or abutments 36 and 40, Figs. 1 and 2, bent outwardly at right angles to the legs 24 and 26 bear against the plate 16 and lend lateral support to the bracket.

The invention provides a rigid mounting for a bracket or the like, and enables ready attachment of a bracket or hook to the supporting body. The method of mounting the bracket is very simple and consists of tilting the bracket upwardly, inserting the catch in an aperture in the supporting plate, and swinging the bracket downwardly to insert the snap fastener portion thereof in the aperture provided for that purpose. The bracket is particularly well adapted for production by manufacturers having sheet metal stamping and forming facilities. It is far more rigid than hooks formed out of twisted wire and will support heavier loads. Once in position it is positively held against accidental detachment by the catch 22 and can be removed only by upwardly tilting the entire structure.

Obviously the principles of the invention can be embodied in a wide variety of sheet metal brackets and similar supporting devices. A bracket for supporting shelves, for example, could be constructed according to the inventive concept herein disclosed, and there are a large number of other possible uses. The invention is accordingly not to be limited to the specific embodiment shown and described, but is capable of other modifications and changes without departing from the spirit and scope of the following claims.

The invention is hereby claimed as follows:

1. A one-piece bracket for mounting on an upright apertured member, comprising a sheet metal piece formed to provide two resilient legs, opposed hook-shaped catch arms at the junction of said legs for positively gripping said member, locking stud sections respectively carried by said legs, and an arm adapted to extend laterally of said member.

2. A one-piece sheet metal bracket for attachment to an upright, apertured supporting plate, comprising a tubular body adapted to project from said plate, a catch extending from said body, a plurality of resilient legs extending away from said catch, oppositely arranged snap fastener members carried by said legs, said catch and said fastener members being adapted for successive insertion respectively in the supporting plate, and tabs extending laterally from said legs to brace the hook against sideward movement.

3. A sheet metal bracket comprising a substantially L-shaped body adapted to be mounted on an upright, apertured supporting plate with a tubular arm thereof extending horizontally and leg portions depending from said arm adjacent the plate, a catch at the junction of said arm and said leg portions adapted to be inserted in an aperture in the supporting plate when the bracket is tilted upwardly to dispose said tubular arm at an angle with respect to horizontal, and resilient stud portions on each of said leg portions for insertion in an aperture in the plate when the bracket is swung downwardly following such insertion of said catch, said stud portions effecting locking engagement of the bracket with the plate when said arm attains a horizontal position.

OUGLJESA JULES POUPITCH.

REFERENCES CITED

The following references are of record in the file of this patent:

UNITED STATES PATENTS

| Number | Name | Date |
|---|---|---|
| 723,677 | Kade | Mar. 24, 1903 |
| 786,935 | Wright | Apr. 11, 1905 |
| 836,045 | Melchior | Nov. 13, 1906 |
| 1,803,016 | Harsted | Apr. 28, 1931 |
| 1,852,598 | Vogt | Apr. 5, 1932 |
| 2,130,536 | Chaffee | Sept. 20, 1938 |
| 2,218,894 | Schlosser | Oct. 22, 1940 |

FOREIGN PATENTS

| Number | Country | Date |
|---|---|---|
| 280,021 | Germany | Nov. 4, 1914 |
| 700,114 | France | Feb. 24, 1931 |